United States Patent [19]
Demick et al.

[11] Patent Number: 5,673,924
[45] Date of Patent: Oct. 7, 1997

[54] MULTI-FUNCTION BABY SUPPORT AND TRANSPORTATION APPARATUS

[76] Inventors: Scott A. Demick; Mayra I. Demick, both of 19312 Poinciana, Redford, Mich. 48240

[21] Appl. No.: 539,362

[22] Filed: Oct. 5, 1995

[51] Int. Cl.⁶ ........................................ B62B 7/10
[52] U.S. Cl. .................... 280/30; 280/643; 280/47.41
[58] Field of Search .................... 280/30, 31, 43, 280/642, 643, 647, 648, 649, 650, 655, 655.1, 658, 47.38, 47.4, 47.41; 297/DIG. 3

[56] References Cited

U.S. PATENT DOCUMENTS

| | | | |
|---|---|---|---|
| 2,446,302 | 8/1948 | Newberry | 280/647 |
| 2,574,743 | 11/1951 | King | 280/35 |
| 2,691,179 | 10/1954 | Kann | 297/DIG. 3 |
| 2,790,484 | 4/1957 | Pollack | 280/47.4 |
| 2,902,286 | 9/1959 | Wood, Jr. | 280/31 |
| 3,258,276 | 6/1966 | Murcott | 280/47.4 |
| 4,874,182 | 10/1989 | Clark | 280/30 |
| 4,878,680 | 11/1989 | Molnar | 280/30 |
| 4,946,180 | 8/1990 | Baer | 280/47.38 |
| 5,133,567 | 7/1992 | Owens | 280/30 |
| 5,234,224 | 8/1993 | Kim | 280/30 |
| 5,318,311 | 6/1994 | Bofill | 280/30 |

FOREIGN PATENT DOCUMENTS

| | | | |
|---|---|---|---|
| 911766 | 7/1946 | France | 280/47.4 |

*Primary Examiner*—Brian L. Johnson
*Assistant Examiner*—Frank Vanaman
*Attorney, Agent, or Firm*—Joseph N. Breaux

[57] ABSTRACT

A multi-function baby support and transportation apparatus is provided of the type which is convertible to be used in a car seat mode, a carrier mode, a stroller mode or a high chair mode. The multi-function baby support and transportation apparatus comprises: a housing having a horizontal portion, an inclined portion, parallel sidewalls, a rear wall, and a bottom wall; the rear wall defining a compartment therein; a door hingedly connected to the rear wall for covering the compartment; a telescopic handle rotatably connected to the housing; a seat structure having a leg section and a back section, the leg section is rigidly connected within the horizontal portion of the housing, the back section is movably disposed within the inclined section of the housing; an adjustable air bladder incorporated within the back section of the seat structure; an undercarriage defining a lower and upper hollow portion; a wheel assembly hingedly connected to an underside of the undercarriage, the wheel assembly is lockable in an extended position, the wheel assembly is retractable within the lower hollow portion; and legs in connection between the housing and the undercarriage in a manner such that the housing can be vertically separated from the undercarriage.

6 Claims, 6 Drawing Sheets

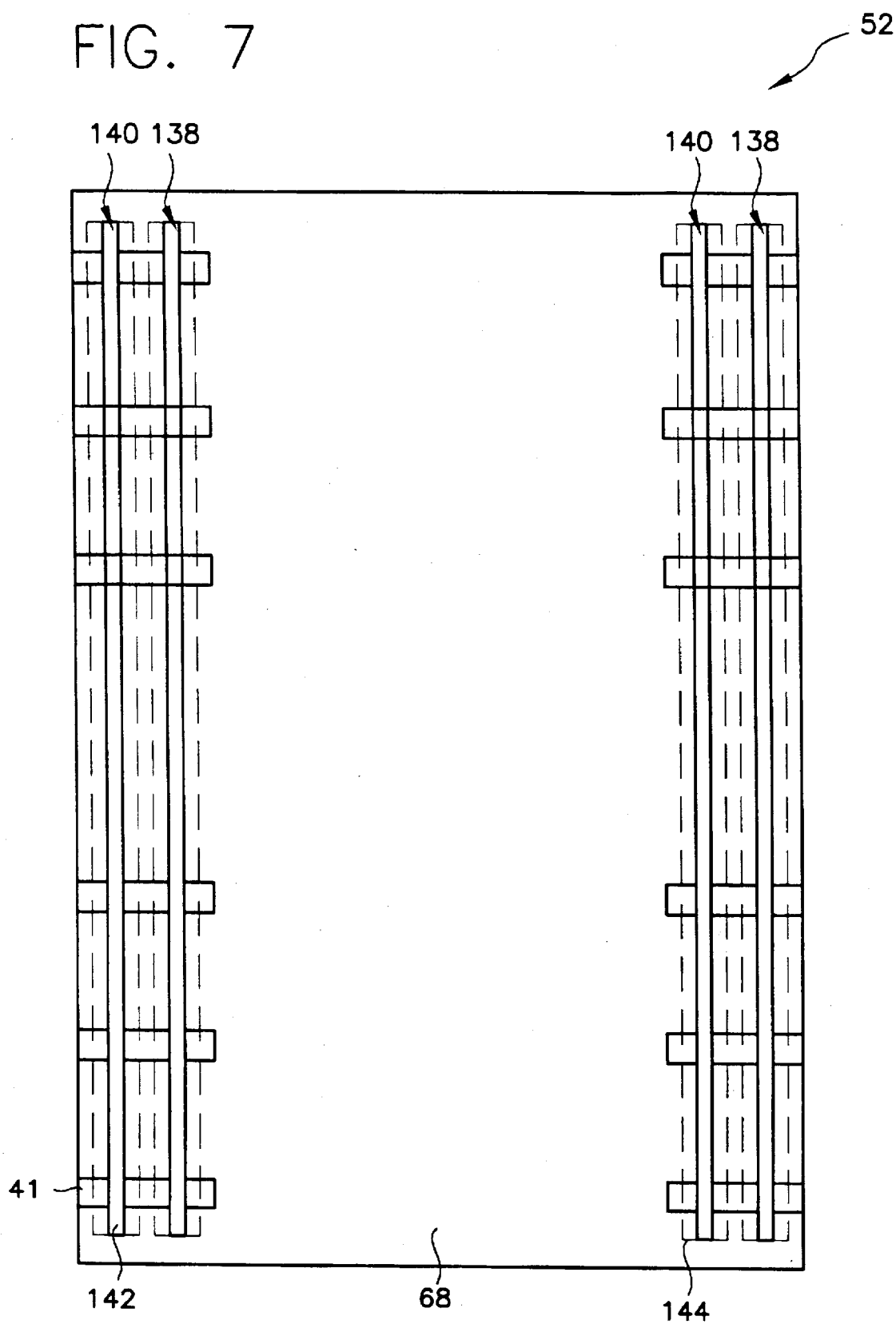

MULTI-FUNCTION BABY SUPPORT AND TRANSPORTATION APPARATUS

TECHNICAL FIELD

The present invention relates to devices for supporting and transporting infants and more particularly to devices for supporting and transporting infants that is convertible for use as a high chair, a stroller, a car seat or as a carrier.

BACKGROUND ART

In the past parents have had to purchase separate devices to be used as car seats, strollers, carriers and high chairs. Having several different devices to serve these purposes is both expensive and inconvenient when storage space is limited or while traveling. There are devices which combine some of these features, however, these devices require disassembly for conversion. In addition, these previous devices do not provide storage compartments for a food tray and other infant supplies such as diapers, bottles, blankets and the like.

It would be a benefit, therefore, to have an unitary apparatus that is convertible for use as a high chair, a stroller, a car seat or as a carrier. It would be a further benefit, to have an apparatus that carries and stores a food tray and other infant supplies therein.

GENERAL SUMMARY DISCUSSION OF INVENTION

It is thus an object of the invention to provide a multi-function baby support and transportation apparatus that has a superstructure for supporting a child that is vertically extensible from an undercarriage that provides a storage space and carries a retractable wheel assembly.

It is a further object of the invention to provide a multi-function baby support and transportation apparatus that is convertible to a high chair configuration, a stroller configuration, a car seat configuration and a carrier configuration.

It is a still further object of the invention to provide a multi-function baby support and transportation apparatus that has storage compartments for storing a food tray connectable to the superstructure and a storage compartment for other supplies.

It is a still further object of the invention to provide a multi-function baby support and transportation apparatus that has wheels which are retractable into a hollow lower portion of the undercarriage.

Accordingly, a multi-function baby support and transportation apparatus is provided of the type which is convertible to be used in a car seat mode, a carrier mode, a stroller mode or a high chair mode. The multi-function baby support and transportation apparatus comprises: a housing having a horizontal portion, an inclined portion, parallel sidewalls, a rear wall, and a bottom wall; the rear wall defining a compartment therein; a door hingedly connected to the rear wall for covering the compartment; a telescopic handle rotatably connected to the housing; a seat structure having a leg section and a back section, the leg section is rigidly connected within the horizontal portion of the housing, the back section is movably disposed within the inclined section of the housing; an adjustable air bladder incorporated within the back section of the seat structure; an undercarriage defining a lower and upper hollow portion; a wheel assembly hingedly connected to an underside of the undercarriage, the wheel assembly is lockable in an extended position, the wheel assembly is retractable within the lower hollow portion; and legs in connection between the housing and the undercarriage in a manner such that the housing can be vertically separated from the undercarriage.

A food tray is provided that is connectable to the housing. The food tray has arms which extend from the underside of the tray for connecting to the housing. Preferably, the arms are foldable for storage within the compartment formed by the rear wall of the housing.

In a preferred embodiment, the multi-function baby support and transportation apparatus has a safety belt and a means for securing the apparatus in the car seat mode within a vehicle. The safety belt may include a first safety belt having a tongue end and a second safety belt having a buckle end that is interconnectable with the tongue end of the first safety belt. The apparatus may be secured within a vehicle by passing a vehicle's seat belt through aligned pathways formed in the parallel sidewalls of the housing.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 7 is a bottom view of the housing.

EXEMPLARY MODE FOR CARRYING OUT THE INVENTION

Figure 1:
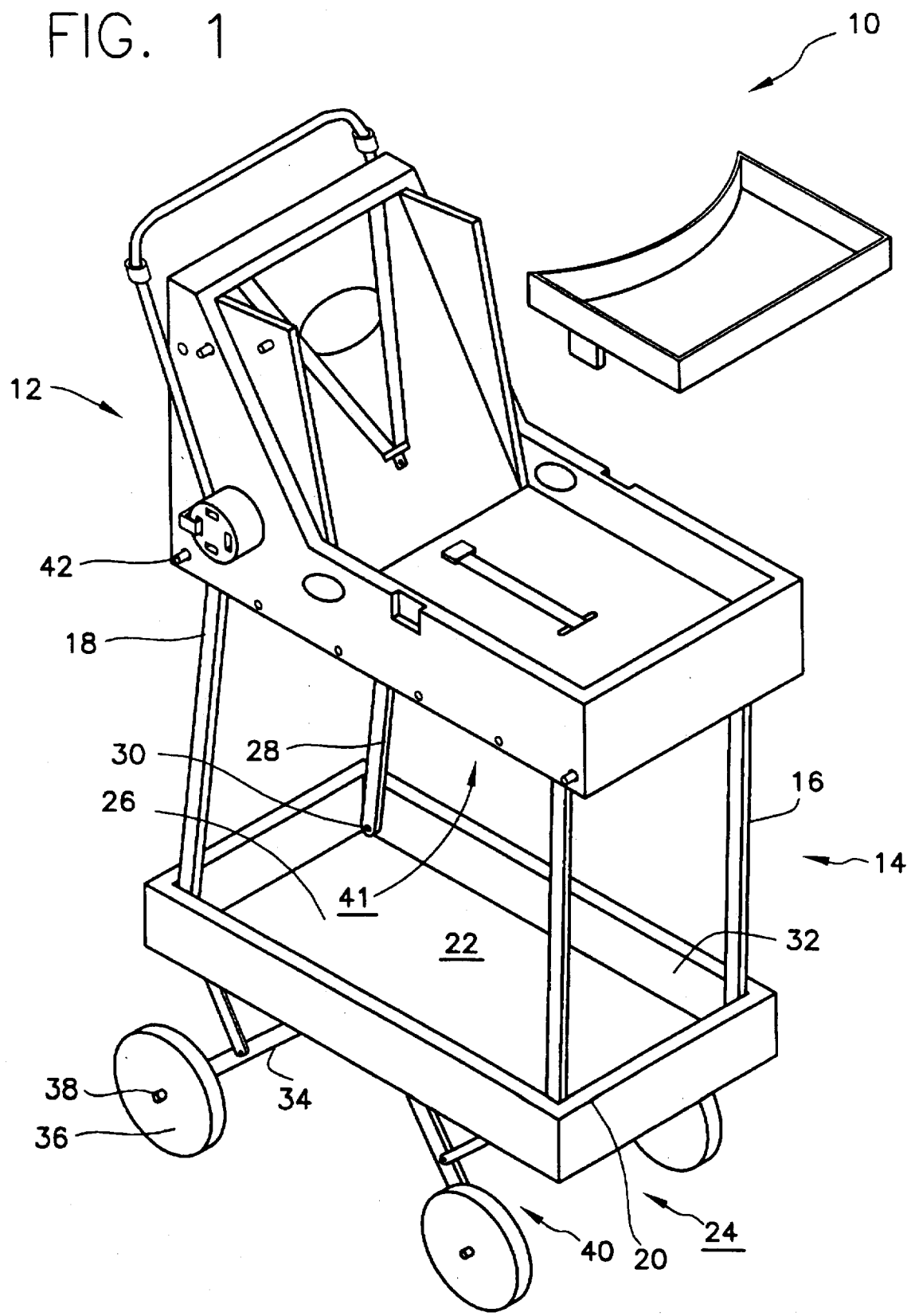
FIG. 1 is a perspective view of an exemplary embodiment of the multi-function baby support and transportation apparatus of the present invention.

FIG. 1 is a perspective view of an exemplary embodiment of the multi-function baby support and transportation apparatus of the present invention generally designated by the numeral 10. Apparatus 10 includes a superstructure generally designated 12 and an undercarriage generally designated 14. Superstructure 12 is connected to undercarriage 14 by front legs 16 and back legs 18 in a manner such that superstructure 12 can be selectively separated vertically from undercarriage 14.

Undercarriage 14 includes a rectangular base 20 constructed of a durable, rigid plastic. Base 20 forms a hollow upper and lower portion 22,24 separated by a rigid partition 26. Hollow upper portion 22 defines a space for storing supplies such as baby bottles, diapers and the like.

Front and back legs 16,18 have first ends 28 and second ends (not shown). Front and back legs 16,18 are identical in construction and dimension. First ends 28 are pivotedly connected by pivot pins 30 to the inner surface 32 of base 20. The second ends of front and back legs 16,18 are slidably connected to superstructure 12 and are locked in selected positions by locking pins 42 disposed within locking pin passages 41. Superstructure 12 is vertically extendable from undercarriage 14 by locking legs 16,18 in various positions in relation to superstructure 12. Superstructure 12 can be locked in a position in contact with undercarriage 14 (not shown) for use as a car seat, stroller or carrier, or vertically separated from undercarriage 14 for use as a high chair as shown.

Undercarriage 14 includes a wheel assemblies comprising shafts 34, wheels 36 and a locking mechanism 40. Shafts 34 hingedly connected to the underside of partition 26 (not shown). Wheels 36 are rotatably connected to the terminal ends 38 of shafts 34. Shafts 34 are movable from an extended position as shown in FIG. 1 to a retracted position wherein shafts 34 and wheels 36 are held within hollow lower portion 24 of base 20 (not shown). Shafts 34 are lockable in the extended position by a locking mechanism generally designated 40 in connection between shafts 34 and the underside of partition 26 (not shown).

Figure 2:
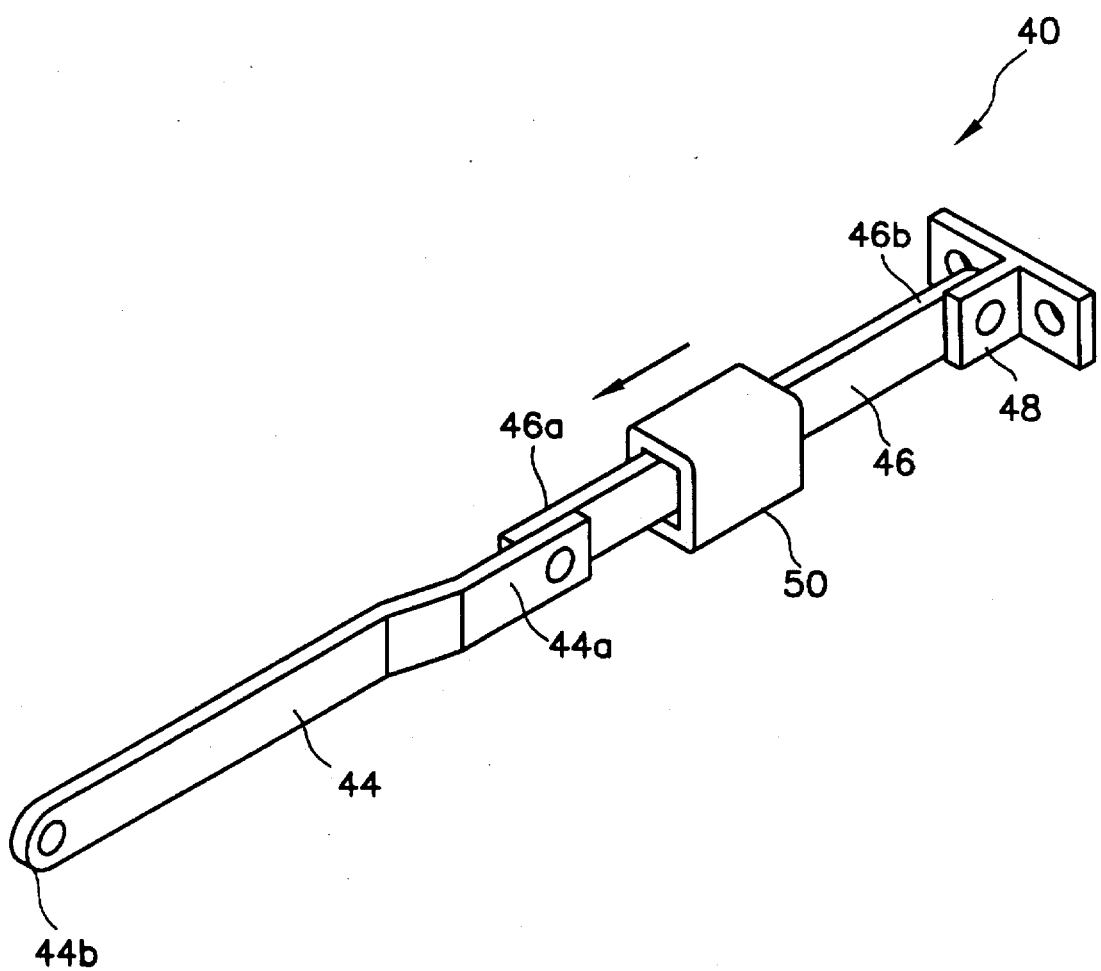
FIG. 2 is a perspective view of the locking mechanism in isolation.

FIG. 2 is a perspective view of locking mechanism 40 in isolation. Locking mechanism 40 includes a first flat bar member 44 and a second flat bar member 46 pivotally attached to each other at respective first ends thereof 44a, 46a. First bar member 44 has a second end 44b pivotedly attached to a shaft 34 (FIG. 1). The second end 46b pivotedly attaches to a base plate clip 48. Base plate clip 48 is fixedly attached to the underside of partition 26 (not shown). A bar clamp 50 is slidably attached about second bar member 46 and can be moved longitudinally thereon to secure the respective bar members 44,46 in aligned displacement.

Figure 3:
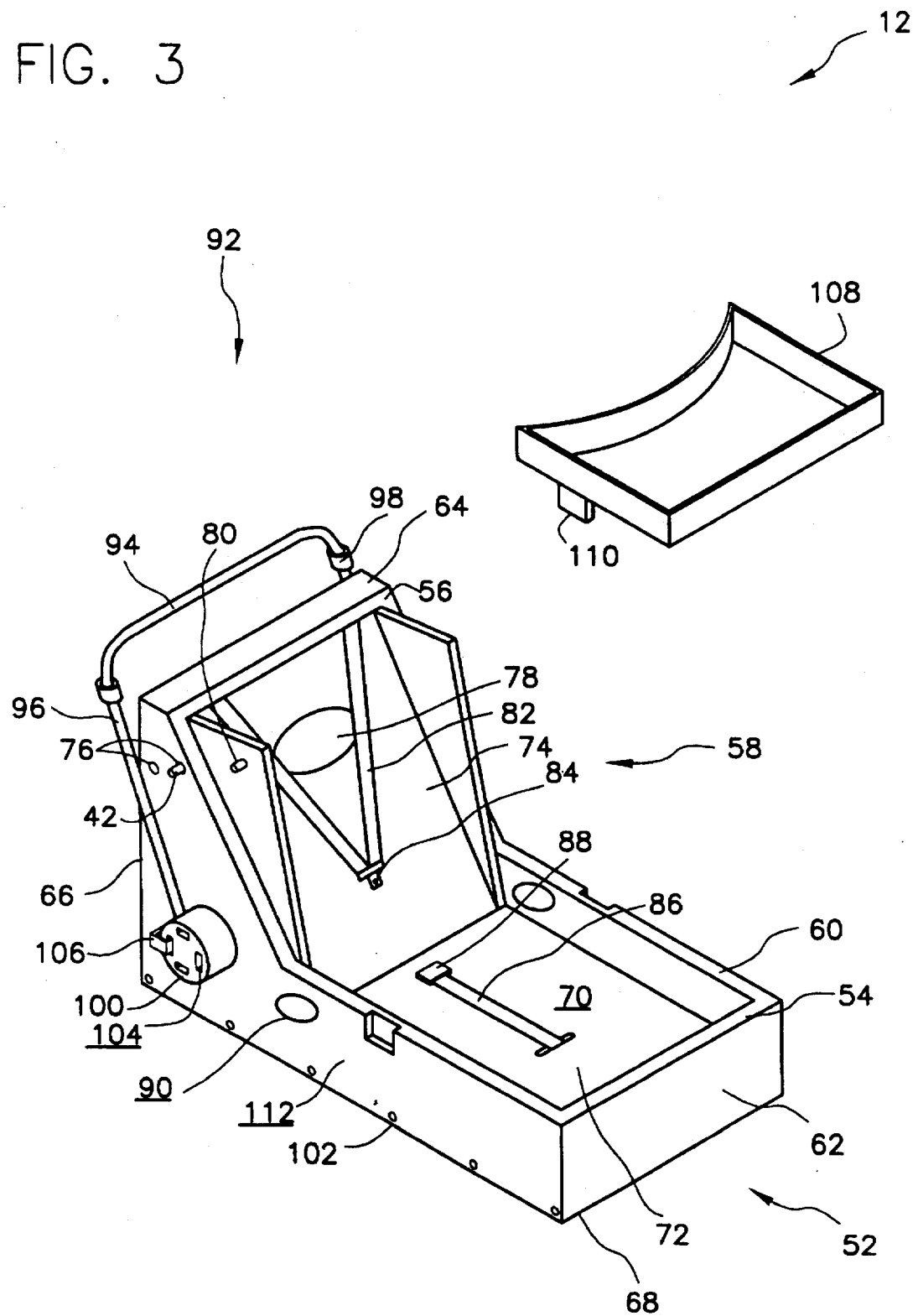
FIG. 3 is a perspective view of the superstructure.

FIG. 3 is a perspective view of superstructure 12. Superstructure 12 includes a housing generally designated 52 having a horizontal portion 54 and an inclined portion 56, and a seat structure generally designated 58.

Housing 52 has two parallel sidewalls 60, a front wall 62, a top wall 64, a rear wall 66 and a bottom wall 68. Superstructure 12 defines a chamber 70 for disposing seat structure 58 and a child (not shown). Inclined portion 56 is inclined at an angle of sixty degrees from horizontal.

Seat structure 58 has a leg section 72 and a back section 74. Leg section 72 is rigidly connected within chamber 70 defined by horizontal portion 54 of housing 52. Leg section 72 slopes downwardly towards front wall 62.

Back section 74 is movably disposed within chamber 70 of inclined portion 56. Sidewalls 60 of inclined portion 56 forms two apertures 76 therethrough for disposing a locking pin 42 supporting back section 74 in either a substantially vertical position, as shown, or in a reclined position (not shown). Back section 74 incorporates an adjustable air bladder 78 for supporting an infant's head. A duck-bill valve 80 is fluidly connected to air bladder 78 by a flexible tube (not shown) incorporated within back section 74 for adjusting the volume of air within air bladder 78.

A first safety belt 82 having a tongue end 84 is connected to the top wall 64 of housing 52. A second safety belt 86 having a buckle end 88 interconnectable with tongue end 84 is attached to bottom wall 68. Opposite sidewalls 60 of horizontal portion 54 form aligned pathways 90 for disposing a vehicle's seat belt (not shown) securing apparatus 10 in the car seat mode within the vehicle.

Apparatus 10 includes a telescopic handle, generally designated 92, rotatably connected to housing 52. Handle 92 includes a U-shaped member 94 telescopically fitted within extension members 96. U-shaped member 94 is locked in place by a threaded locking cap 98. Extension members 96 are attached to hubs 100. Hubs 100 are rotatably connected to the exterior surface 102 of sidewalls 60. Hubs 100 form slots 104 thereon for disposing a holding mechanism 106 for locking handle 92 in a desired orientation relative to housing 52. Holding mechanism 106 is a flexible metal tongue connected to exterior surface 102 of sidewall 60.

Apparatus 10 further includes a food tray 108 connectable with housing 52. Tray 108 includes arms 110 which are disposable within recesses 112 defined by sidewalls 60. Arms 110 are foldably connected to tray 108 for storage.

Figure 4:
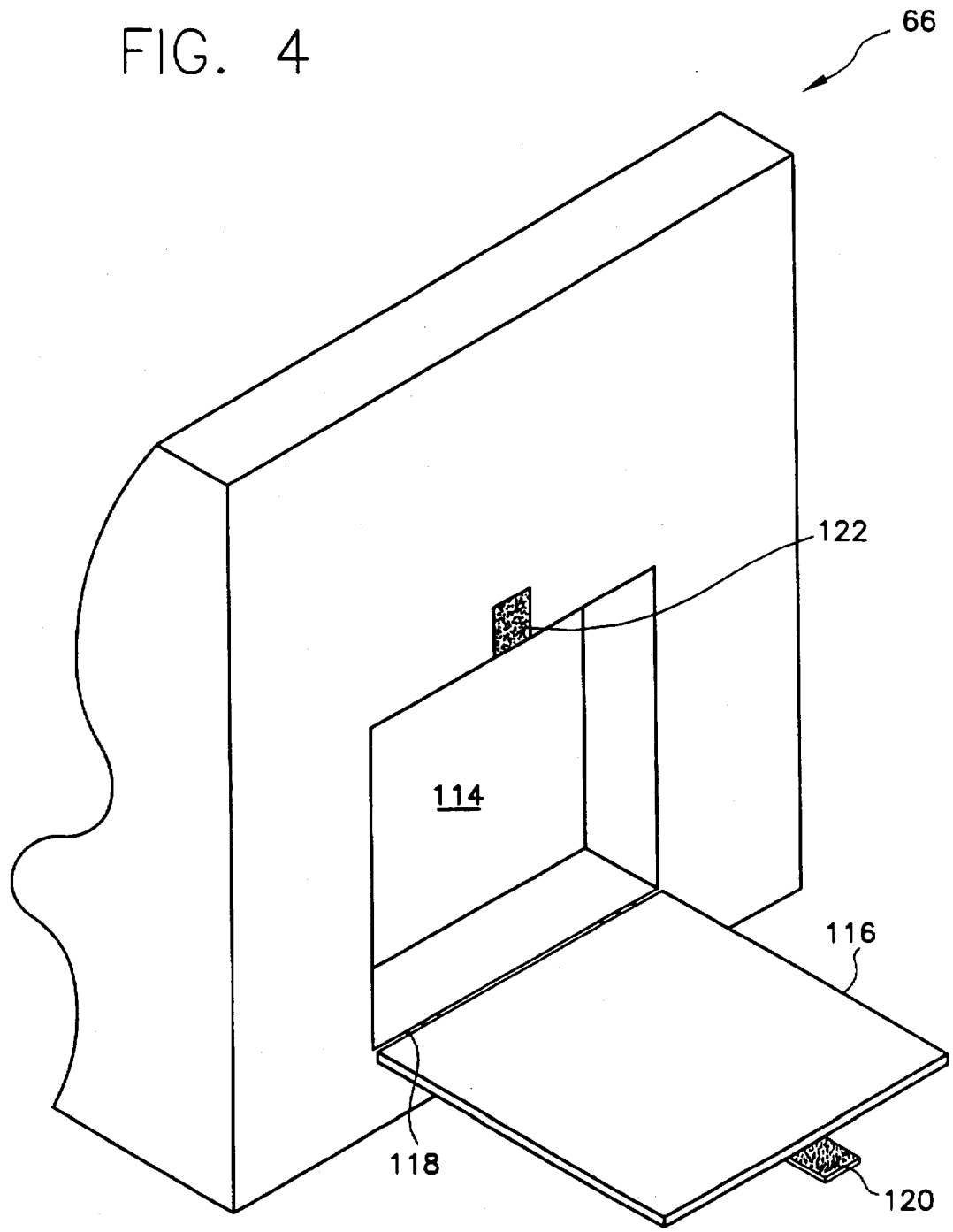
FIG. 4 is a perspective view of the rear wall of the housing.

FIG. 4 is a perspective view of rear wall 66 of housing 52. Rear wall 66 forms a compartment 114 therein for storing tray 108 (FIG. 3). A door 116 is hingedly connected to rear wall 66 by hinges 118 for covering compartment 114. Door 116 is lockably held in a closed position by a first hook and pile fastener 120 connected to door 116 and a second compatible hook and pile fastener 122 attached to rear wall 66.

Figure 5:
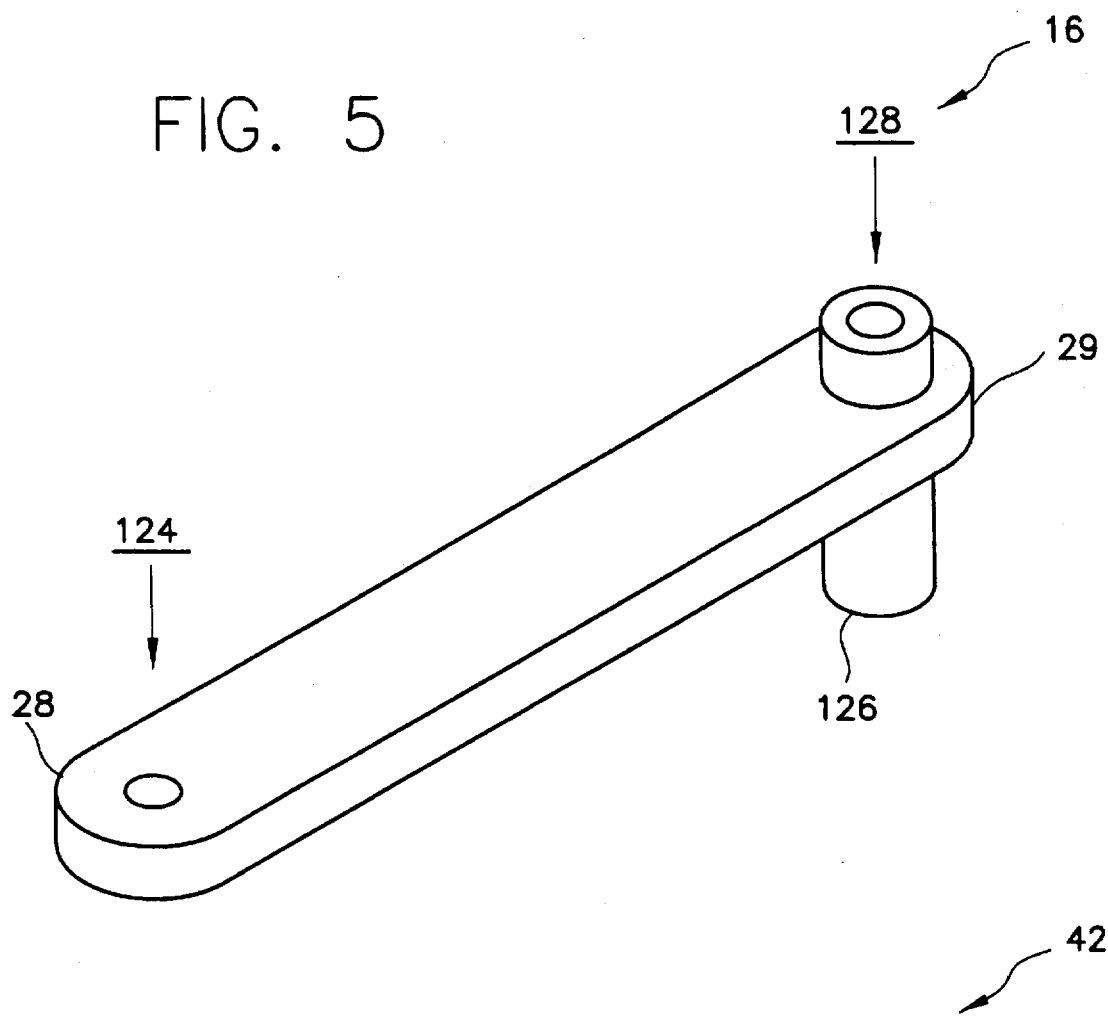
FIG. 5 is a perspective view of a leg in isolation.

FIG. 5 is a perspective view of a front leg 16 in isolation. Front legs 16 and back legs 18 have the same dimensions. Leg 16 is an elongated, planar metal member having a first and second end 28,29. First end 28 forms a hole 124 for pivotedly connecting leg 16 to inner surface 32 of base 20 (FIG. 1). A circular flange 126 extends from both sides of second end 19. Circular flange 126 forms a locking pin pathway 128 therethrough sized to dispose a locking pin 42 (FIG. 1).

Figure 6:
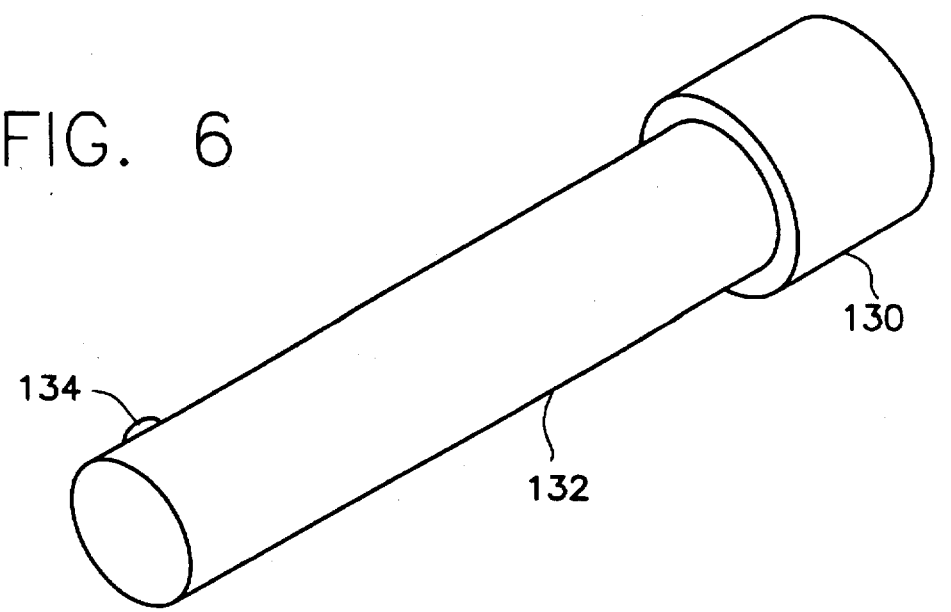
FIG. 6 is a perspective view of a locking pin in isolation.

FIG. 6 is a perspective view of locking pin 42 in isolation. Locking pin 42 includes a head 130 and a tubular section 132. Tubular section 132 is hollow and holds a spring (not shown) carrying a ball 134. Ball 134 extends partially through tubular section 132 and is depressible for securing locking pin 42 within a locking pin passage 41 (FIG. 1).

FIG. 7 is a bottom view of housing 52 of superstructure 12. Housing 12 forms a pair of inner and outer T-shaped trackways 138,140 spaced parallel to one another and extending along the longitudinal axis of housing 52. Trackways 138,140 have a first section 142 formed perpendicular to bottom wall 68, and a second section 144 indicated by the dashed lines. Locking pin passages 41, indicated by the dashed lines, intersect second sections 144 of trackways 138,140.

Referring now to FIGS. 1, 5, 6 and 7, second ends 29 of front legs 16 are slidably disposed within inner trackways 138 and second ends 29 of back legs 18 are slidably disposed within outer trackways 140. Circular flanges 126 of legs 16,18 are slidably entrapped within second sections 144 of trackways 138,140. The distance between superstructure 12 and undercarriage 14 can be adjusted by removing locking pins 42 from locking pin passages 41, sliding legs 16,18 within trackways 138,140 aligning locking pin passages 41 and locking pin pathways 128; superstructure 12 is then locked in place by inserting tubular section 132 of locking pin 42 into locking pin passages 41 and through locking pin pathways 128 of legs 16,18.

It can be seen from the preceding description that a device for supporting and transporting infants which has a superstructure for supporting a child that is vertically extensible from an undercarriage that provides a storage space and carries a retractable wheel assembly, is convertible to a high chair configuration, a stroller configuration, a car seat configuration and a carrier configuration, has storage compartments for storing a food tray connectable to the superstructure and a storage compartment for other supplies, and that has wheels which are retractable into a hollow lower portion of the undercarriage has been provided.

It is noted that the embodiment of the multi-function baby support and transportation apparatus described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A multi-function baby support and transportation apparatus comprising:

a housing having a horizontal portion, an inclined portion, parallel sidewalls, a rear wall, and a bottom wall, said rear wall defining a compartment therein;

a door hingedly connected to said rear wall for covering said compartment;

a telescopic handle rotatably connected to said housing;

a seat structure having a leg section and a back section, said leg section being rigidly connected to said horizontal portion of said housing, said back section being movable disposed on said inclined portion of said housing;

an adjustable air bladder incorporated within said back section of said seat structure;

an undercarriage defining an upper hollow portion;

a wheel assembly hingedly connected to an underside of said undercarriage; and support legs in connection between said housing and said undercarriage in a manner such that said housing can be vertically separated from said undercarriage, said support legs each having a first end pivotally connected to said undercarriage and a second end slidably connected to said housing.

2. The multi-function baby support and transportation apparatus of claim 1, wherein:

said second end of each of said support legs is selectively lockable in relation to said housing.

3. A multi-function baby support and transportation apparatus comprising:

a housing having a horizontal portion, an inclined portion, parallel sidewalls, a rear wall, and a bottom wall;

said parallel sidewalls forming aligned pathways for disposing a seat belt therethrough for securing said multi-function baby support and transportation apparatus within a vehicle;

said rear wall defining a compartment therein;

a door hingedly connected to said rear wall for covering said compartment;

a telescopic handle rotatably connected to said housing;

a seat structure having a leg section and a back section, said leg section being rigidly connected to said horizontal portion of said housing, said back section being movably disposed on said inclined portion of said housing;

an adjustable air bladder incorporated within said back section of said seat structure;

a valve in fluid connection with said adjustable air bladder for adjusting air pressure within said air bladder;

a first safety belt having a tongue end, said first safety belt being connected to said housing; and a second safety belt having a buckle end interconnectable with said tongue end of said first safety belt, said second safety belt being connected to said housing;

an undercarriage defining an upper hollow portion;

a wheel assembly hingedly connected to an underside of said undercarriage;

support legs in connection between said housing and said undercarriage in a manner such that said housing can be vertically separated from said undercarriage, said support legs each having a first end pivotally connected to said undercarriage and a second end slidably connected to said housing; and a food tray connectable to said housing, said food tray having arms foldably connected thereto for connecting said food tray to said housing.

4. The multi-function baby support and transportation apparatus of claim 3, wherein:

said second end of each of said support legs is selectively lockable in relation to said housing.

5. A multi-function baby support and transportation apparatus comprising:

a housing having a horizontal portion, an inclined portion, parallel sidewalls, a rear wall, and a bottom wall, said parallel sidewalls forming aligned pathways for disposing a seat belt therethrough for securing said multi-function baby support and transportation apparatus within a vehicle, said rear wall defining a compartment therein;

a door hingedly connected to said rear wall for covering said compartment;

a telescopic handle rotatably connected to said housing;

a holding mechanism in connection between said housing and said telescopic handle for locking said telescoping handle in a desired orientation relative to said housing;

a seat structure having a leg section and a back section, said leg section being rigidly connected to said horizontal portion of said housing, said back section being movably disposed on said inclined portion of said housing;

an adjustable air bladder incorporated within said back section of said seat structure;

a valve in fluid connection with said adjustable air bladder for adjusting air pressure within said air bladder;

a first safety belt having a tongue end, said first safety belt being connected to said housing; and a second safety belt having a buckle end interconnectable with said tongue end of said first safety belt, said second safety belt being connected to said housing;

an undercarriage defining an upper hollow portion;

a wheel assembly hingedly connected to an underside of said undercarriage;

support legs in connection between said housing and said undercarriage in a manner such that said housing can be vertically separated from said undercarriage, said support legs each having a first end pivotally connected to said undercarriage and a second end slidably connected to said housing; and a food tray connectable to said housing, said food tray having arms foldably connected thereto for connecting said food tray to said housing.

6. The multi-function baby support and transportation apparatus of claim 5, wherein:

said second end of each of said support legs is selectively lockable in relation to said housing.

* * * * *